United States Patent Office 3,804,949
Patented Apr. 16, 1974

3,804,949
PROCESS OF PROMOTING HEALING OF WOUNDS
Leslie L. Balassa, Blooming Grove, N.Y. assignor to Lescarden Ltd., Goshen, N.Y.
No Drawing. Original application Feb. 12, 1968, Ser. No. 704,540, now Patent No. 3,624,201. Divided and this application Dec. 24, 1970, Ser. No. 101,418
The portion of the term of the patent subsequent to Nov. 30, 1988, has been disclaimed
Int. Cl. A61k 27/00
U.S. Cl. 424—128    3 Claims

ABSTRACT OF THE DISCLOSURE

Wound healing compositions comprising a calcium phosphate or magnesium phosphate, and mixtures of the foregoing with chitin are described as well as methods of promoting healing of wounds.

---

This application is a division of my copending application Ser. No. 704,540 filed Feb. 12, 1968 now U.S. Pat. 3,624,201.

This invention relates to methods of promoting healing of wounds and compositions therefor containing a calcium phosphate or magnesium phosphate.

Medicine has long been interested in improving the healing of wounds. Patients suffering from diabetes or undergoing extensive cortisone treatment show extremely slow rates of healing for any wounds which they receive. Thus, surgery on such patients involves additional risks not present with other patients. Moreover, rapid healing of wounds is particularly desired for patients in tropical countries where the risk of infection is high. Rapid healing is also desired in the case of soldiers who have been wounded in a battle zone and cannot easily and quickly be removed therefrom. Acceleration of wound healing is highly desirable in the case of patients who cannot readily be immobilized such as farm animals.

In evaluating the utility of a material to promote wound healing, a reproducible test is necessary to give comparative data. Such a test method has been described by Prudden et al. in "The Acceleration of Wound Healing with Cartilage," Surgery, Gynecology and Obstetrics, 105:283 (1957). In this method, rats are tested in pairs, each pair receiving an identical surgical incision, only the one rat of the pair receiving a measured dose of the material whose wound healing properties are to be determined. The pair is then kept in the same cage and the tensile strengths of the wounds in the two rats are determined in millimeters of mercury. The difference in the tensile strengths between the treated rat and the control rat is expressed as the percentage improvement obtained. Considering biological variance, it is believed that only differences of about 10% or more are significant.

There have been several recent developments reported concerning materials which promote wound healing. In this connection, U.S. Pat. No. 3,232,836 describes the parenteral administration of N-acetylglucosamine as a wound healing material. Utilizing the test method of Prudden et al. referred to in the preceding paragraph, N-acetylglucosamine showed improvement in tensile strength of only about 10% whereas Prudden and his coworkers have reported significantly larger increases in wound healing by the use of cartilage preparations from various animals. It has also been reported in U.S. Pat. Nos. 3,194,732 and 3,196,075 that eggshell membrane in either fibrous or nonfibrous form are effective for stimulating or assisting the healing process in damaged mammalian tissue. According to these patents, the eggshell membrane is obtained by separation of this material from the eggshell by mechanical or other suitable means, with the membrane-free eggshell being discarded. In my copending application Ser. No. 704,539 filed Feb. 12, 1968, it is disclosed that membrane-free eggshells are an effective wound healing accelerator.

Now it has been surprisingly discovered that the calcium and magnesium salts of phosphoric acid may be used alone or in combination with other wound healing accelerators to produce results in accordance with the method of Prudden et al. which are at least equal to and in many instances greater than the results obtained with the prior art wound healing accelerators.

Accordingly, one aspect of the present invention relates to novel methods of promoting and assisting the healing of wounds, as for example damaged mammalian tissue, open ulcers, etc. in humans and animals.

Another aspect of the present invention relates to significant improvements in wound healing of tissue that has been lost or damaged as a result of injuries, by the topical application of at least one finely divided material such as calcium and magnesium salts of phosphoric acid, e.g. calcium phosphate, magnesium phosphate or a mixture of the foregoing materials with chitin.

A further aspect of the present invention relates to novel compositions for accelerating the healing of wounds and their method of production.

These and other aspects of the present invention will be apparent from the following description.

As used herein, the term "chitin" embraces naturally occurring chitin, synthetic chitin as well as poly (N-acetylglucosamine) and its epimer poly (N-acetylgalactosamine). Chitin is believed to be poly (N-acetylglucosamine) which forms the cell walls of fungi and the hard shell of insects and crustaceans.

The wound healing accelerators contemplated by the present invention include calcium and magnesium salts of phosphoric acid such as magnesium phosphate and calcium phosphate (e.g. monobasic, dibasic) and a mixture of these salts with chitin.

Suitable sources of chitin are from lobsters, shrimp and other crustacea. To utilize chitin from such sources, it is necessary to reduce the chitin in particle size to less than about 150 microns. Lobster shell chitin is purified by slurrying it in 1N HCl to remove the acid soluble materials and then washed with aqueous NaOH to remove the soluble protein materials. Thereafter, the material is thoroughly washed with distilled water, dried and ground to the desired fineness.

Chitin of fungal origin may also be used and has the advantage of being simpler to process. The cell walls of fungi are made of chitin and it is not necessary to extract the chitin from this material. Thus, after suitable sterilization as by heat or gas (i.e. ethylene oxide), the entire fungal mat produced by fermentation of a fungus in a suitable nutrient medium may be ground and used to promote healing of wounds. Preferably, however, the fungal mat is treated to removed the extraneous materials, leaving only the chitin skeletons.

The method of application of the wound healing accelerators of this invention may be carried out in accordance with the procedures developed for cartilage as described in my copending application Ser. No. 435,693 filed Feb. 26, 1965, now U.S. Pat. No. 3,400,199, the disclosure of which is incorporated herein by reference. Thus, it is preferred to topically apply the foregoing materials directly to the wound surface. The finely divided calcium phosphate or magnesium phosphate have a fineness preferably in the range of 40 to 70 microns. However, a fineness of up to about 200 microns is acceptable.

The finely divided wound healing accelerators may be applied topically by blowing a metered amount of the material onto the wound using a hand atomizer. Alternatively, it may be applied by dusting as from a hand shaker or may be placed together with an inert gas under increased pressure (i.e. above atmospheric pressure) in a pressure vessel. In this latter means of application, termed "aerosol application," the finely divided material, optionally with other medicaments, may be packaged as a dry aerosol powder as described in Dutch patent application No. 6,415,252, published July 5, 1965 (this patent application is directed to a medicament for bovine mastitis but the method of aerosol packaging described is applicable to powdered medicament having the described particle size), or as an aerosol foam.

The wound healing accelerators of the present invention may be used alone or with therapeutically effective agents such as ascorbic acid, ascorbyl palmitate, pharmaceutically acceptable zinc salts, e.g. zinc oxide, zinc stearate, zinc citrate; antiseptics such as lidocaine, procaine, etc.; antibiotics such as neomycin, chroroamphenicol, sulfanilamide, tetracycline, etc.

The following example is illustrative of the wound healing activity of the various materials of the invention. The wound efficiency is determined by using the method of Prudden et al. as described above. In general, at least ten pairs of rats are used to obtain a meaningful average for each material tested. In this example, a powder insufflator is used to apply 2 to 10 mg. of material per cm.$^2$ of wound surface.

EXAMPLE

Reagent grade calcium phosphate (dibasic)) was placed in a laboratory ball mill and reduced to a fineness between about 40 to 70 microns.

The resulting calcium phosphate powder was topically applied to ten test rats of ten pairs of rats as previously described. Using the Prudden assay method, an average increase of about 24% over the untreated animals was observed.

A finely divided powder or dispersion of the wound healing materials of this invention may also be used in conjunction with materials such as cotton or cellulosic fibers and deposited as a coating or coating on base materials such as cellulose or cellulose acetate or nylon or regenerated cellulose, or plastic base materials, either woven or nonwoven in sheet form perforated or imperforate. Moreover, the finally divided wound healing accelerators of the present invention may be bonded to a suitable base material, e.g. cotton gauze, plastic sheet, etc., using an appropriate adhesive formulation, e.g. pectin, gelatin, starch, innocuous vegetable gums, etc. The foregoing articles of manufacture can be obtained in accordance with the procedure described in the examples of U.S. Pat. No. 3,194,732.

Although the present invention has been described in conjunction with preferred embodiments, it is to be understood that modifications and variations may be resorted to without departing from the spirit and scope thereof, as those skilled in the art will readily understand. Such variations and modifications are considered to be within the purview and scope of the appended claims.

What is claimed is:

1. A method of facilitating healing of a wound in a mammal afflicted with a wound which comprises topically administering to the surface of said wound a therapeutically effective dose of finely divided magnesium phosphate having an average particles size below about 70 microns.

2. The method of facilitating healing of a wound in a mammal afflicted with a wound which comprises topically administering to the surface of said wound a therapeutically effective dose of finely divided magnesium phosphate, said material having an average particle size in the range of from about 40 to about 70 microns.

3. The method of claim 1 wherein said wound is an ucler of the body surface.

References Cited
UNITED STATES PATENTS

| | | | |
|---|---|---|---|
| 2,570,532 | 10/1951 | Eisenberg et al. | 424—128 |
| 3,075,880 | 1/1963 | Roth | 424—128 |
| 3,085,048 | 4/1963 | Bush | 424—128 |

ALBERT T. MEYERS, Primary Examiner

F. E. WADDELL, Assistant Examiner

U.S. Cl. X.R.

424—28